United States Patent

Kaufmann

[11] 4,099,587
[45] Jul. 11, 1978

[54] ELECTROMAGNETIC COMPENSATION WEIGHING APPARATUS INCLUDING PRELOADING AND LOAD-RESPONSIVE CURRENT COMPONENTS

[75] Inventor: Peter Kaufmann, Greifensee, Switzerland

[73] Assignee: Mettler Instrumente, AG, Greifensee, Switzerland

[21] Appl. No.: 732,480

[22] Filed: Oct. 14, 1976

[30] Foreign Application Priority Data

Nov. 18, 1975 [CH] Switzerland ............... 14903/75

[51] Int. Cl.² ..................................... G01G 7/00
[52] U.S. Cl. ................................ 177/210 EM; 177/212
[58] Field of Search ........... 177/212, 210 EM, 210 C; 73/141 R

[56] References Cited

U.S. PATENT DOCUMENTS

| | | | |
|---|---|---|---|
| 3,688,854 | 9/1972 | Strobel | 177/212 X |
| 3,786,678 | 1/1974 | Kunz | 177/212 X |
| 3,786,883 | 1/1974 | Kunz | 177/212 X |

Primary Examiner—Joseph W. Hartary
Attorney, Agent, or Firm—Lawrence E. Laubscher

[57] ABSTRACT

Weighing apparatus of the electromagnetic compensation type is disclosed, wherein the compensation coil means is continuously supplied with a first component of compensation current which at least partially compensates for the no-load preloading effect of the movable pan carrier system, said coil means being periodically supplied with a second component of compensation current which is a direct function of the magnitude of the load being weighed. Indicating means are provided which are responsive to the magnitude of the second current component to present a visual indication of the magnitude of the load being weighed. In one embodiment, separate sources of compensation current and counter pulses are provided, while in a second embodiment the compensation current is obtained from a pulse generator supplied with a high frequency voltage from the source which provides the counting pulses.

7 Claims, 4 Drawing Figures

ELECTROMAGNETIC COMPENSATION WEIGHING APPARATUS INCLUDING PRELOADING AND LOAD-RESPONSIVE CURRENT COMPONENTS

BRIEF DESCRIPTION OF THE PRIOR ART

It is well known in the patented prior art to provide weighing apparatus of the electromagnetic compensation type, as evidenced, for example, by the patents to Baumgartner U.S. Pat. No. 3,677,357, Strobel U.S. Pat. No. 3,688,854, Kunz U.S. Pat. No. 3,786,678 and 3,786,883, Allenspach U.S. Pat. No. 3,786,884, Allenspach et al U.S. Pat. No. 3,788,410, Strobel et al U.S. Pat. No. 3,789,937, and Baumann et al U.S. Pat. No. 3,816,156.

In some of the these known systems, a compensation coil arranged in the air gap of a stationary permanent magnet system is electrically associated with a switch member which is operable periodically to conduct current from a compensation current generator through the compensation coil for a period of time which is proportional to the load to be weighed. The switch member is controlled by a control and comparison circuit, and counter means are provided for counting constant-frequency pulses during the period of time that the compensation current generator is connected with the compensation coil. The counter result is then displayed at a digital display device as the weighting result.

In such a weighing apparatus, deflection of the support means for carrying an article or material to be weighed, under the effect of the weight thereof, away from a normal neutral position is compensated or counteracted by the interaction between the magnetic field produced by the electric current in the coil, and the magnetic field of the permanent magnet system. In the equilibrium condition, that is to say, after the carrier means has substantially returned to its neutral position, the magnitude of the current flowing in the coil is proportional to the load to be weighed. As mentioned above, the flowing current is determined on the principle of time comparison, and is displayed digitally. One possible way of doing this is to take the current from a pulse generator, counting the current pulses which are applied to the coil in each selected time unit, and displaying the count result. Another possibility is using a constant current and counting off, by means of time marks such as clock pulses, those time intervals during which the constant current flows in the coil, and displaying the sum of the clock pulses.

These known electromagnetic compensation weighing systems possess certain inherent drawbacks. For example, in many cases the total deflection-producing load on the carrier means includes both the actual material to be weighed (in many cases inclusive of a tare) and the pre-load constituted by the load-carrier means, per se. Accordingly this combined load is compensated for and counted accordingly. As a result, the selection of the counting frequency, with a predetermined or desired degree of resolution for the weighing apparatus, is determined by the total load, whereas the desired high degree of resolution which is of interest is only in the actual weighing range itself. This applies in particular in respect of weighing apparatus in which the load-carrier means is guided so as to move parallel to itself by way of links, for the major part of the system weight constitutes a dead load which must be compensated. It will be appreciated that only a part of the weight of the links is carried by the apparatus frame or housing on which the links are mounted. In the case of beam balances in which the dead load of the load-carrier means is usually compensated by a counterweight (or a mechanical counteracting force) arranged at the side of the main balance beam bearing remote from the load-carrier means, this kind of preloading for the electrical compensation means is in fact omitted. However, in this case also the above-mentioned weakness can be unacceptably apparent in many cases, for example when weighing operations are frequently to be carried out with a relatively high tare value, which remains constant, or at least approximately constant.

SUMMARY OF THE INVENTION

In accordance with a primary object of the present invention, there is provided an electromagnetic compensation weighing apparatus including means for carrying a load to be weighed, a permanent magnet system having an air gap, a compensation current coil arranged in the air gap of the permanent magnet system, a compensation current generator, and means for dividing the compensation current generator output current into a first portion which is effective for compensating for the no-load preloading effect of the weighing apparatus, and a second portion which is periodically supplied to the compensation current coil — as controlled by switch means — for a time that is proportional to the load being weighed, whereby the second compensation current portion compensates only for the load being weighed. A control circuit is provided for controlling the actuation of the switch means and for supplying constant-frequency counter pulses to counter means during the time periods that the second compensation current portion is supplied to the compensation coil means. The counter in turn is connected with display means which display the counter result, thereby to represent the weight of the load.

In a first embodiment of the invention, the dividing means includes a second compensation current coil arranged in series between the source of compensation current and the first-mentioned compensation current coil. When high requirements are made in respect of the resolution capability of the apparatus, and in order to avoid the problems of calibration and maintaining constant and constant-frequency compensation current pulses, the compensation current generator advantageously is in the form of a constant current generator and gate means are operable for supplying counter pulses to the counter during the time that the switch causes current to be conducted to the compensation coil.

In a second embodiment, resistance means are connected in parallel across a compensation coil by periodically operable switch means, whereby at least a portion of the preloading effect is compensated for by the current which flows continuously through the coil.

DESCRIPTION OF THE DRAWINGS

Other objects and advantages of the invention will become apparent from a study of the following specification, when viewed in the light of the accompanying drawing, in which.

DETAILED DESCRIPTION

Figure 1:
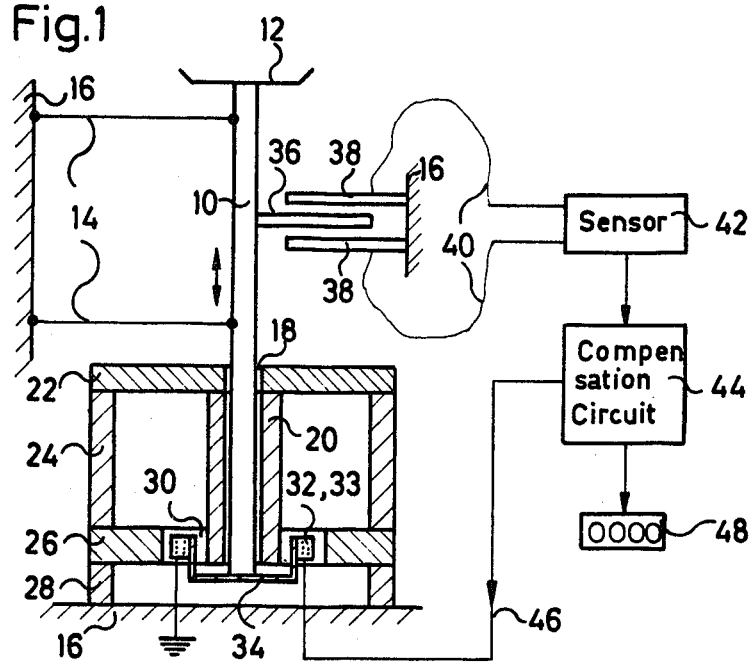
FIG. 1 illustrates diagrammatically a weighing apparatus of the electromagnetic compensation type incorporating a first embodiment of the invention.

Referring first more particularly to FIG. 1, the apparatus includes load-carrier means which substantially comprises a vertical support rod or tube 10 and a weighing pan 12 and which is guided, so as to be movable parallel to itself, by means of two links 14 connected with the apparatus frame 16. The vertical support 10 passes with clearance through a central passage 18 in a cylindrical iron core 20 which is secured to an upper circular closure plate 22 of ferromagnetic material. Arranged concentrically around the core 20 is a permanent pot magnet 24 which at its top end is connected to the plate 22 and at its bottom end to a pole shoe plate 26. An annular base 28 of non-magnetic material forms a mounting for the magnet system 22, 24, 26, on the frame 16. A compensation coil 32 secured to the vertical support 10 is movable in an annular air gap 30 between the core 20 and the pole shoe 26, the compensation coil 32 being wound on a carrier 34 of electrically insulating material carried by the vertical support 10. It should be noted that reference numeral 33 in FIG. 1 relates to a further coil which is a part of the circuit shown in FIG. 2 and which will be described in greater detail below.

A capacitor plate 36 is secured to the vertical support 10 at a position intermediate the levels of the two links 14, but on the side of the support 10 remote from the links 14. The movable capacitor plate 36 is disposed in the gap between two stationary capacitor plates 38 which are mounted on the frame 16, the capacitor plates 36, 38 forming a differential capacitor.

Other conventional mechanical details of the apparatus such as housing, travel limiting means (abutments) and the like, have not been illustrated for the sake of clarity.

The electrical circuitry of the weighing apparatus of FIG. 1, which is only shown by way of diagrammatic indication herein, includes, besides the coil 32 and the differential capacitor 36 and 38, a sensing or transmitter circuit 42 which is generally in the form of a bridge circuit and which is connected by leads 40 to the capacitor plates 38. The sensing circuit output terminal is connected with a compensation circuit 44 which includes, inter alia, a control amplifier, a current source and an evaluation circuit, said compensation circuit having a first output terminal connected with the coil 32, and a second output terminal connected with conventional display means 48. As is known in the art, upon the application of a load to be weighed to the pan carrier, the pan carrier and the vertical support 10 are displaced downwardly from the illustrated neutral position (i.e., the position at which the capacitor plate 36 is positioned at equally spaced relation between the two plates 38), thereby producing a difference or error signal in the transmitter circuit 42. In the control portion of the circuit 44, this difference or error signal determines the magnitude of a compensation current flowing through the coil 32. In the steady condition of the apparatus, the electromagnetic field produced by the coil 32 in the air gap 30 of the permanent magnet field compensates or counteracts the effect of the weight of the material being weighed on the weighing pan 12 (and the dead load of the apparatus, that is to say, the weight of the movable part of the apparatus, including the members 10, 12). Thus the counteracting force causes the apparatus to be returned substantially to its neutral position. The magnitude of the compensation current required for this purpose is converted into a digital weight value in the evaluation part of the circuit, and displayed at the display means 48.

Figure 2:
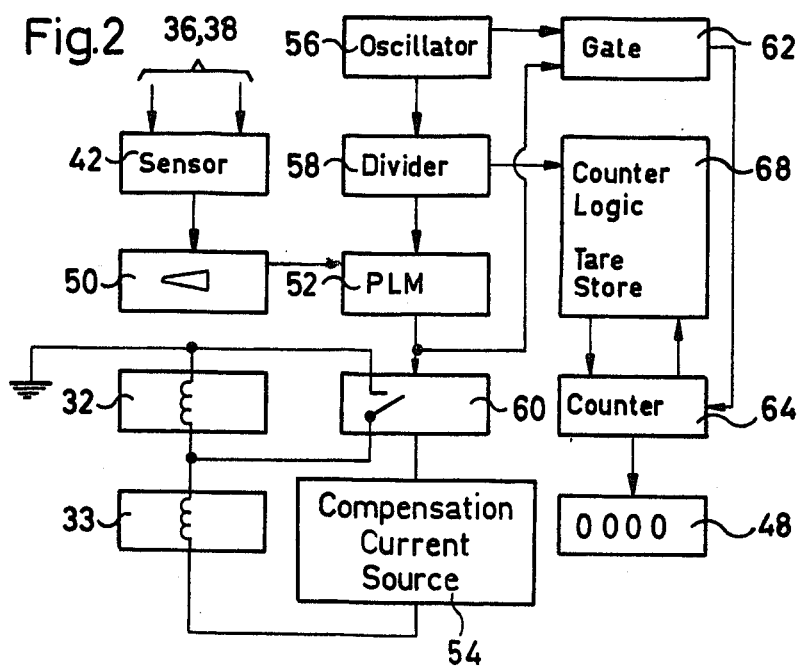
FIG. 2 is a block diagram of the electrical compensating circuit of the apparatus of FIG. 1.

FIG. 2 shows the block circuit diagram of a first embodiment of a weighing apparatus according to the invention. This embodiment operates on the known principle of pulse length modulation. Thus, the output control signal from circuit 42 is passed to a control amplifier 50 and from there to a pulse length modulator 52. Here the control signal is compared to a constant-frequency sawtooth voltage of period T. An oscillator 56 acting as a clock transmitter starts the sawtooth voltage in the pulse length modulator 52, at a frequency which is reduced in the frequency divider 58; at the same time the pulse length modulator 52 transmits a signal to an electronic switch 60 which opens at that moment and thus causes current from a constant current source 54 to be conducted through the coil 32. As soon as the sawtooth voltage in the pulse length modulator 52 has reached the value of the control signal, the switch 60 is closed by a further signal from the pulse length modulator 52 to the switch 60 and thus the current is conducted only through the switch. The switch 60 is preferably virtually without resistance, so that virtually no current flows through the coil 32 when the switch is closed. This sequence is repeated in each period T. The operation of this circuit is known in the art, as evidenced, for example, by the patents to Kunz U.S. Pat. No. 3,786,883 and Allenspach U.S. Pat. No. 3,786,884.

During the time that the current source 54 is connected with the coil 32, high-frequency clock pulses pass from the oscillator 56 through a gate 62 into a counter 64. When the current is switched over from the coil 32 to the switch 60 the gate 62 is closed, and the counter condition is transferred into a storage means (not shown), and displayed at 47 as the weight result. At the beginning of the next following period T, the gate 62 is opened again by the pulse length modulator 52 and the counter 64 is set to zero by means of a counter logic unit 68 controlled by the frequency divider 58; the next evaluation cycle can then commence.

In the FIG. 2 embodiment of the invention, there is provided, in accordance with the present invention, an additional compensation coil 33. This coil 33 is wound jointly with the coil 32 on the coil carrier 34 (see FIG. 1), one coil above the other. Besides giving a compact construction, this arrangement ensures that the two coils always have the same field lines of flux passing through them. As shown in FIG. 2, the compensation coil 33 is connected in series between the compensation current source 54 and the parallel circuit comprising coil 32 and switch 60. This means that, irrespective of the position of the switch 60, the compensation coil 33 always has a constant current flowing through it. By suitably selecting the number of windings forming the coil 33, adapted to the amplitude of the constant current from source 54 and the strength of the magnetic field, a desired portion of the apparatus preloading or dead load comprising the weight of the carrier rod or tube 10 and the weighing pan 12 may be compensated with that coil 33 so that the monitored current which flows intermittently through the coil 32 is available virtually alone for the weighing range. This construction has the advantage that a current which is identical even in the event of temperature fluctuations flows through both coils 32, 33, even if such current only flows intermittently in one of the coils (i.e., coil 32).

For reasons of stability, it is advantageous for only about 80 to 90% of the above-mentioned preloading to be compensated by means of the coil 33, the remainder thus being compensated by means of the coil 32. The portion of the pulsed current to the coil 32, corresponding to the remainder of the preloading, can then be separated from the weight value to be determined, by means of an electrical zero setting device, or taring device. This can be effected for example by means of a device which is already known per se and which is therefore not illustrated separately and which involves the counter 64 being in the form of a settable forwards-backwards counter with associated but separate tare storage means.

Thus, in a weighing apparatus constructed as in FIG. 2 it is, for example, possible for the degree of resolution available for the weighing range to be increased by 40%, with an unchanged counting frequency, with separate compensation, as by coil 33, of only two-thirds of the given dead load of the load-carrier means 10, 12. This value can be substantially increased upon suitable adaptation of the parameters involved, such as dead load, weighing range, and counting frequency.

Figure 3:
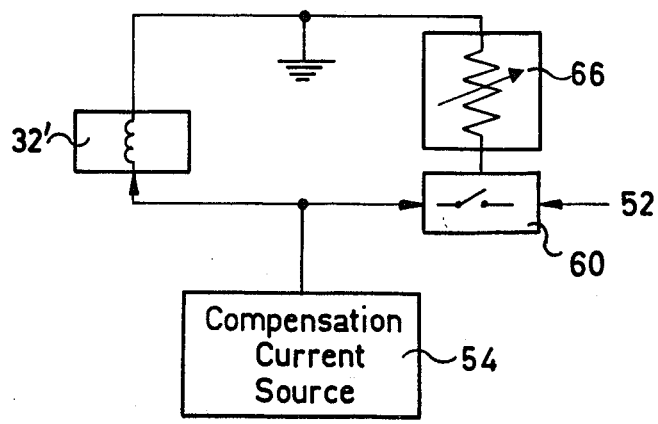
FIG. 3 is a detailed block diagram of a second embodiment of the invention.

In the embodiment shown in FIG. 3, an adjustable resistor 66 is used instead of the coil 33, the resistor being connected to the output of switch 60, in parallel with the coil 32'. This construction affords the advantage that only one coil is required. However, the possible influence of fluctuations in temperature on the resistance values of the resistor 66 and the coil 32' must be taken into account in this embodiment. In this construction the strength of the current flowing through the single compensation coil 32' varies; thus, when the switch 60 is open the maximum current flows from the source 54 through the coil 32', while when the switch 60 is closed a part of the current from the source 54 flows through the resistor 66. Adjustment of this resistor 66 makes it possible for the proportion of current flowing continuously through the coil 32' to be adjusted to the value corresponding to a given preloading, i.e. the dead load of the load-carrier means 10, 12 and/or a tare loading. The proportion of the current that flows continuously through the coil 32' is not converted into digital form and displayed.

Figure 4:
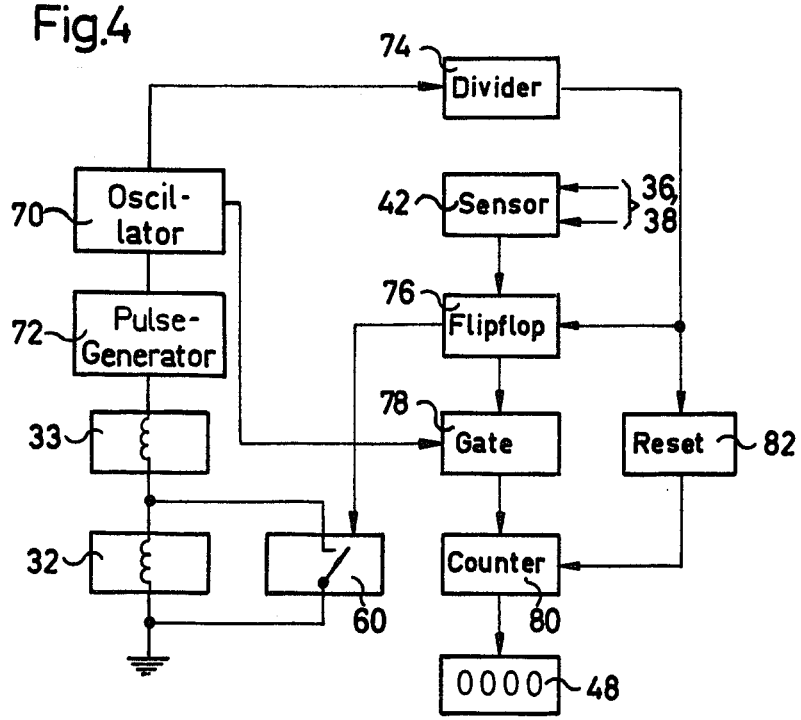
FIG. 4 is a block diagram of the electrical system of a third embodiment of the invention.

The circuit block diagram of FIG. 4 shows another embodiment of the apparatus of this invention. FIG. 4 again refers to a weighing apparatus of the general construction shown in FIG. 1 including two compensation coils 32 and 33, and to this extent FIG. 4 is similar to FIG. 2. However, unlike the FIG. 2 circuit which has a constant current source or generator 54 and in which the period of time that the generator 54 is connected to the coil 32 is counted by means of time marks, the FIG. 4 embodiment provides, in a manner known per se, that pulses taken from a common source are employed both for electromagnetic compensation or counteraction and also for direct counting.

Thus, the FIG. 4 circuit has an oscillator 70 to supply a high-frequency voltage to a pulse generator 72. The current pulses at the output of the generator 72, being of constant frequency, amplitude and length, pass to the coil 33 continuously but to the coil 32 intermittently, depending on the position of the switch 60.

Also connected to the output of the oscillator 70 is a frequency divider 74 which periodically sets a flipflop 76, and activates a resetting means 82 so that a counter 80 is set to zero at the same time. Setting of the flipflop 76 causes the switch 60 to close and at the same time causes a gate 78 to be opened. The voltage pulses from the oscillator 70 now pass through the gate 78 to actuate the counter 80, until an equilibrium signal from the transmitter circuit 42 resets the flipflop 76. This causes the switch 60 to be opened and the gate 78 to be closed. The counting operation is now concluded, and the state of the counter 80 forming the weighing result can be passed to the display means 48.

For the sake of clarity it should be noted that the term preloading used in this specification may, depending on the construction of the weighing apparatus and/or the use thereof, mean the dead weight of the load-carrying means 10, 12 and/or a tare value.

It will be seen from the foregoing that the current which is effective to produce electromagnetic compensation in the air gap 30 of the magnet system 22, 24, 26 is composed of a permanently flowing uniform portion which compensates for the preloading effect of the movable components, and a load-dependent portion which flows intermittently under the control by the switch 60, the two portions originating from the same current generator. With this arrangement, as mentioned above, for practical reasons, it may be advantageous for only 90% of the preloading to be compensated by the continuously flowing portion, the rest of the preloading being included in the weighing range of the apparatus, at least when there is an electrical zero-setting device.

Although as described above with reference to FIGS. 2 and 4, the switch 60 is connected in parallel with the first coil 32 and is in the form of an on-off switch so that the current coming from the second coil 33 flows either through the first coil 32 or through the switch 60, the switch could, in the alternative, be connected in series between the two coils and be in the form of a change-over switch between the first coil and, for example, a substitute load.

The illustrated embodiments are preferred however, since an arrangement with an on-off switch 60 is simpler to produce than one with a change-over switch.

Finally, it will be appreciated that the above-described embodiments of the apparatus of the invention can provide a reduction in the counting frequency required while maintaining the same degree of resolution in the weighing range proper, or alternatively an increase in the degree of resolution in the weighing range while maintaining the same counting frequency.

While in accordance with the provisions of the Patent Statutes the preferred forms and embodiments of the apparatus have been illustrated and described, it will be apparent to those skilled in the art that various changes and modifications may be made in the disclosed apparatus without deviating from the inventive concepts set forth above.

What is claimed is:

1. In a weighing system of the electromagnetic compensation type including a single load support means for supporting a load for movement from a normal first position relative to a stationary frame, sensing means for generating a signal that is a function of the extent of displacement of said load support means by the load from said first position, permanent magnet means connected with said frame to define an air gap relative to said load supporting means, compensation coil means including at least one compensation coil connected with said load support means and arranged within said air gap, compensating current supply means operable by said sensing means for supplying compensating current to said compensation coil means, and indicating means for indicating the magnitude of the load as a function of the compensating current required to restore the load supporting means to the first position, the improvement wherein (a) said compensating current supply means comprises
  (1) a source of compensating current;
  (2) preload modifying means adapted for circuit connection with said compensation coil means to vary the effective impedance thereof; and
  (3) switch means for selectively connecting said compensation coil means and said preload modifying means with said compensating current source to divide the compensating current into a continuous first current portion which corresponds with up to about 90% of the preloading effect of said load support means, and a second portion that is periodically supplied to said coil means for periods of time that are a function of the magnitude of the load applied to said load support means plus the remainder of said preloading effect; and
  (4) control means operable by said sensing means for operating said switch as a function of the position of said load support means;
(b) said indicating means being responsive only to said second compensating current portion, whereby said indicating means affords an indication of the load being weighed substantially independently of the no-load preloading effect of said load support means.

2. In a weighing system of the electromagnetic compensation type including load support means for supporting a load for movement from a normal first position relative to a stationary frame, sensing means for generating a signal that is a function of the extent of displacement of said load support means by the load from said first position, permanent magnet means connected with said frame to define an air gap relative to said load supporting means, compensation coil means including at least one compensation coil connected with said load support means and arranged within said air gap, compensating current supply means operable by said sensing means for supplying compensating current to said compensation coil means, and indicating means for indicating the magnitude of the load as a function of the compensating current required to restore the load supporting means to the first position; the improvement wherein (a) said compensation coil means includes first (32) and second (33) compensation coils each connected with said load support means for movement therewith;
(b) and further wherein said compensating current supply means comprises
  (1) a source of compensating current, said second compensation coil being connected in series between said compensating current source and said first compensation coil;
  (2) means including a switch (60) connected between said compensating current source and said compensation coil means for dividing the compensating current into a continuous first current portion which generally corresponds with the preloading effect of said load support means, and a second portion that is periodically supplied to said coil means for periods of time that are a function of the magnitude of the load applied to said load support means; and
  (3) control means operable by said sensing means for operating said switch as a function of the position of said load support means;
(c) said indicating means being responsive only to said second compensating current portion, whereby said indicating means affords an indication of the load being weighed substantially independently of the no-load preloading effect of said load support means.

3. In a weighing system of the electromagnetic compensation type including load support means for supporting a load for movement from a normal first position relative to a stationary frame, sensing means for generating a signal that is a function of the extent of displacement of said load support means by the load from said first position, permanent magnet means connected with said frame to define an air gap relative to said load supporting means, compensation coil means including at least one compensation coil connected with said load support means and arranged within said air gap, compensating current supply means operable by said sensing means for supplying compensating current to said compensation coil means, and indicating means for indicating the magnitude of the load as a function of the compensating current required to restore the load supporting means to the first position; the improvement wherein (a) said compensation coil means includes first (32) and second (33) compensation coils;
(b) and further wherein said compensation current supply means comprises
  (1) a source of compensating current, said second compensation coil being connected in series between said compensating current source and said first compensation coil;
  (2) means including a switch (60) connected in parallel across said first compensation coil for dividing the compensating current into a continuous first current portion which generally corresponds with the preloading effect of said load support means, and a second portion that is periodically supplied to said first coil means for periods of time that are a function of the magnitude of the load applied to said load support means; and
  (3) control means operable by said sensing means for operating said switch as a function of the position of said load support means;
(c) said indicating means being responsive only to said second compensating current portion, whereby said indicating means affords an indication of the load being weighed substantially independently of the no-load preloading effect of said load supporting means.

4. In a weighing system of the electromagnetic compensation type including load support means for supporting a load for movement from a normal first position relative to a stationary frame, sensing means for generating a signal that is a function of the extent of displacement of said load support means by the load from said first position, permanent magnet means connected with said frame to define an air gap relative to said load supporting means, compensation coil means including at least one compensation coil connected with said load support means and arranged within said air gap, compensating current supply means operable by said sensing means for supplying compensating current to said compensation coil means, and indicating means for indicating the magnitude of the load as a function of the compensating current required to restore the load supporting means to the first position; the improvement wherein
  (a) said compensation coil means includes first (32) and second (33) compensation coils wound in superimposed relation on a common carrier connected with said load support means;
  (b) and further wherein said compensating current supply means comprises
    (1) a source of compensating current, said second compensation coil being electrically connected in series between said compensating current source and said first compensation coil;
    (2) means including a switch (60) connected between said compensating current source and said compensation coil means for dividing the compensating current into a continuous first current portion which generally corresponds with the preloading effect of said load support means, and a second portion that is periodically supplied to said coil means for periods of time that are a function of the magnitude of the load applied to said load support means; and
    (3) control means operable by said sensing means for operating said switch as a function of the position of said load support means;
  (c) said indicating means being responsive only to said second compensating current portion, whereby said indicating means affords an indication of the load being weighed substantially independently of the no-load preloading effect of said load support means.

5. In a weighing system of the electromagnetic compensation type including load support means for supporting a load for movement from a normal first position relative to a stationary frame, sensing means for generating a signal that is a function of the extent of displacement of said load support means by the load from said first position, permanent magnet means connected with said frame to define an air gap relative to said load supporting means, compensation coil means including at least one compensation coil connected with said load support means and arranged within said air gap, compensating current supply means operable by said sensing means for supplying compensating current to said compensation coil means, and indicating means for indicating the magnitude of the load as a function of the compensating current required to restore the load supporting means to the first position; the improvement wherein
  (a) said compensating current supply means comprises
    (1) a source of compensating current;
    (2) a resistor (66);
    (3) switch means (60) for periodically connecting said resistor in parallel across said compensation coil means, whereby said compensation coil means is supplied with one value of compensating current when said switch means is in one condition, and with a second value of compensating current when said switch means is in another condition, said switch means thereby being operable to divide the compensating current into a continuous first current portion which generally corresponds with the preloading effect of said load support means, and a second portion that is periodically supplied to said compensation coil means for periods of time that are a function of the magnitude of the load applied to said load support means; and
    (4) control means operable by said sensing means for operating said switch as a function of the position of said load support means;
  (b) said indicating means being responsive only to said second compensating current portion, whereby said indicating means affords an indication of the load being weighed substantially independently of the no-load preloading effect of said load support means.

6. Apparatus as defined in claim 5, wherein said resistor comprises a variable resistor.

7. In a weighing system of the electromagnetic compensation type including load support means for supporting a load for movement from a normal first position relative to a stationary frame, sensing means for generating a signal that is a function of the extent of displacement of said load support means by the load from said first position, permanent magnet means connected with said frame to define an air gap relative to said load supporting means, compensation coil means including at least one compensation coil connected with said load support means and arranged within said air gap, compensating current supply means operably by said sensing means for supplying compensating current to said compensation coil means, and indicating means for indicating the magnitude of the load as a function of the compensating current required to restore the load supporting means to the first position; the improvement wherein
  (a) said compensating current supply means comprises
    (1) a source of compensating current;
    (2) means including a switch connected between said compensating current source and said compensation coil means for dividing the compensating current into a continuous first current portion which generally corresponds with the preloading effect of said load support means, and a second portion that is periodically supplied to said coil means for periods of time that are a function of the magnitude of the load applied to said load support means; and
    (3) control means operable by said sensing means for operating said switch as a function of the position of said load support means;
  (b) said indicating means being responsive only to said second compensating current portion, whereby said indicating means affords an indication of the load being weighed substantially independently of the no-load preloading effect of said load support means, said indicating means including
    (1) a source of counting pulses, said counting pulse source being common with said source of compensating current;
    (2) a counter;
    (3) means for supplying said counting pulses from said source to said counter during the periods of time when the second compensation current portion is being supplied to said compensation coil means;
    (4) digital display means for displaying the totalled result in said counter, thereby to represent the weight of the load being weighed; and
    (5) control circuit means for simultaneously controlling the operation of said switch and the supply of counter pulses to said counter means.

* * * * *